US006236035B1

(12) United States Patent
Saar et al.

(10) Patent No.: US 6,236,035 B1
(45) Date of Patent: May 22, 2001

(54) APPARATUS AND METHOD FOR SENSING WITH TRIANGULATION AND TIME-OF-FLIGHT FOR USE IN AN ACTUATABLE OCCUPANT RESTRAINT SYSTEM

(75) Inventors: David A. Saar, Titusville; Raymond W. Simpson, Hamilton Square, both of NJ (US); Timothy DeZorzi, South Lyon, MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/199,684

(22) Filed: Nov. 25, 1998

(51) Int. Cl.[7] ..................................................... G08B 13/18
(52) U.S. Cl. ........................... 250/221; 340/556; 280/735
(58) Field of Search ............................... 250/221, 222.1, 250/208.1, DIG. 1, 559.38; 340/555, 556, 557, 573; 280/728.1, 734, 735; 180/271, 272, 273; 356/4.01, 4.07, 5.01

(56) References Cited

U.S. PATENT DOCUMENTS

| | | |
|---|---|---|
| 4,341,447 | 7/1982 | Biber . |
| 4,345,827 | 8/1982 | Stemme et al. . |
| 5,068,537 | 11/1991 | Ishikawa et al. . |
| 5,118,134 | 6/1992 | Mattes et al. . |
| 5,330,226 | 7/1994 | Gentry et al. . |
| 5,446,661 | 8/1995 | Gioutsos et al. . |
| 5,482,314 | 1/1996 | Corrado et al. . |
| 5,490,069 | 2/1996 | Gioutsos et al. . |
| 5,510,800 | 4/1996 | McEwan . |
| 5,585,625 | * 12/1996 | Spies ..................................... 250/221 |
| 5,641,963 | 6/1997 | Mueller . |
| 5,653,462 | 8/1997 | Breed et al. . |
| 5,661,490 | 8/1997 | McEwan . |
| 5,703,368 | 12/1997 | Tomooka et al. . |

\* cited by examiner

Primary Examiner—John R. Lee
Assistant Examiner—Kevin Pyo
(74) Attorney, Agent, or Firm—Tarolli, Sundheim, Covell, Tummino & Szabo L.L.P.

(57) ABSTRACT

An apparatus (32) is preferably part of an occupant protection system (10), and the apparatus determines a characteristic of an object (70) that may be located on a seat (14) of a vehicle (12) for use in control of the system. The object (70) may be a vehicle occupant, and the preferred characteristic that is determined is distance between the object and an instrument panel (22) of the vehicle (12). An emitter array (36) and a detector array (50) are located on the instrument panel (22). Each emitter (40) emits a beam (42) along a different path on which the object (70) may be located. Each detector (52) receives beams (42) emitted from the emitter array (36) that are reflected from the object (70). Each reflected beam received at the detector array (50) is indicative of distance between the instrument panel (22) and the object (70). An object sensor controller (34) determines relative intensities at each detector (52) of each reflected and received beam, and also determines time-of-flight of each reflected and received beam(s). The controller (34) processes each determined relative intensity and each determined time-of-flight to determine the object characteristic.

26 Claims, 6 Drawing Sheets

APPARATUS AND METHOD FOR SENSING WITH TRIANGULATION AND TIME-OF-FLIGHT FOR USE IN AN ACTUATABLE OCCUPANT RESTRAINT SYSTEM

FIELD OF THE INVENTION

The present invention is directed to sensing an object located on a seat of a vehicle relative to a portion of the vehicle located adjacent to the vehicle seat, and is particularly directed to sensing via emission and reception of a plurality of beams.

BACKGROUND OF THE INVENTION

Vehicle occupant protection systems having an actuatable protection element are well known in the art. One particular type of actuatable protection system includes an inflatable protection module. An inflatable protection device of the module is commonly referred to as an air bag, and is mounted to inflate within the occupant compartment of the vehicle. The protection module has a source of inflation fluid and an electrically actuatable igniter, referred to as a squib.

The occupant protection system further includes a crash sensor for sensing the occurrence of a vehicle crash condition and for providing an electrical signal indicative of the crash condition. When the sensor indicates that the vehicle is in a crash condition requiring inflation of the air bag to help protect a vehicle occupant ("a deployment crash condition"), an electric signal is provided to the squib for the purpose of igniting the squib. The squib, when ignited, activates the source of inflation fluid (e.g., ignition of a combustible gas or heat generating composition and/or opening of a container of pressurized gas). The source of inflation fluid is operatively coupled to the air bag, and, when activated, inflates the air bag.

Several known occupant protection systems include an occupant position sensor and a controller, which controls the associated protection module in response to a sensed position of a vehicle occupant. In response to the sensed occupant position, the timing of air bag deployment, the pressure of the inflated air bag, aiming of the air bag, and/or disabling the air bag are controlled. These controllable/adjustable aspects, collectively, adjust the dynamic profile of the air bag. A protection system with controllable/adjustable aspects is commonly referred to as a "smart" system.

One example of a system with an adjustable dynamic profile is disclosed in U.S. Pat. No. 5,232,243 to Blackburn et al., and assigned to TRW Vehicle Safety Systems Inc. This patent discloses that it is not always desirable to inflate an air bag with 100 percent of the inflation fluid (e.g., gas) provided from an inflation fluid source. The system disclosed by Blackburn et al. controls the amount of gas that inflates the air bag in response to the detected weight of the occupant. Other example is disclosed in U.S. Pat. No. 5,330,226 to Gentry et al., and assigned to TRW Vehicle Safety Systems Inc. The system disclosed by Gentry et al. controls the amount of gas that inflates an air bag in response to detected occupant position.

SUMMARY OF THE INVENTION

In accordance with one aspect, the present invention provides an apparatus for determining an object characteristic of an object that may be located on a seat of a vehicle. An array of emitting means is located on a portion of the vehicle. Each emitting means emits a beam along a path on which the object may be located. Each path is in a different direction. An array of receiving means is on the portion of the vehicle. Each receiving means receives beams emitted from the array of emitting means that are reflected from the object. Each reflected beam received at the array of receiving means is indicative of distance between the portion of the vehicle and the object. Means determines relative intensities at each receiving means of each reflected and received beam. Means determines time-of-flight of each reflected and received beam between emission of the beam from the array of emitting means and reception of the beam at the array of receiving means. Means processes each determined relative intensity and each determined time-of-flight to determine a distance between the portion of the vehicle and the object, and provides a signal indicative thereof.

In accordance with another aspect, the present invention provides an apparatus for distance determination between a portion of a vehicle that is located adjacent to a vehicle seat and a surface of an object located on the vehicle seat. The apparatus has an array of emitting means, and each emitting means emits a beam toward an associated area at which the surface of the object may be located. Each area is located at a different distance from the portion of the vehicle. The apparatus has an array of receiving means, and each receiving means receives a beam originating from an associated one of a emitting means that is reflected from the surface of the object located at the associated area. Means determines whether reception occurs of each beam at its associated receiving means. Means determines a time-of-flight of each received beam between emission and reception. Means processes results of the determinations of reception and time-of-flight to determine the distance between the portion of the vehicle and the surface of the object, and provides a signal indicative thereof.

In accordance with another aspect, the present invention provides an apparatus for determining an object characteristic of an object that may be located on a seat of a vehicle. A plurality of emitting means is located on the vehicle. Each emitting means emits a beam along a path on which the object may be located. Each path is in a different direction. A plurality of receiving means is on the vehicle. Each receiving means receives at least one emitted beam that has been reflected from the object. Each reflected beam received at one of receiving means is indicative of a distance to the object. Means determines relative intensities at each receiving means of each reflected and received beam. Means determines time-of-flight of each reflected and received beam between emission and reception. Means processes each determined relative intensity and each determined time-of-flight to determine a distance between the portion of the vehicle and the object, and provides a signal indicative thereof.

In accordance with another aspect, the present invention provides a method for determining an object characteristic of an object that may be located on a seat of a vehicle. A plurality of beams is emitted. Each beam is directed along a path on which the object may be located. Each path is in a different direction. Emitted beams that are reflected from the object are received at reception locations. Each reflected beam is indicative of distance between a portion of the vehicle and the object. Relative intensities at each reception location of each reflected and received beam are determined. Time-of-flight of each reflected and received beam between the emission of the beam and the reception of the beam is determined. Each determined relative intensity and each time-of-flight is processed to determine a distance between the portion of the vehicle and the object. A signal indicative of the determination of the distance is provided.

In accordance with yet another aspect, the present invention provides a method for distance determination between a portion of a vehicle that is located adjacent to a vehicle seat and a surface of an object located on the vehicle seat. A plurality of beams is emitted. Each beam is directed toward an associated area at which the surface of the object may be located. Each area is located at a different distance from the portion of the vehicle. An emitted beam that is reflected from the surface of the object that is located at the associated area is received. It is determined which emitted beam was reflected from the surface of the object and received. The determination is indicative that the surface of the object is located at the associated area. A time-of-flight of the reflected and received beam between the emission of the received beam and the reception of the received beam is determined. Results of the determinations of reception and time-of-flight are processed to determine the distance between the portion of the vehicle and the surface of the object. A signal indicative of the determination of the distance is provided.

BRIEF DESCRIPTION OF THE DRAWINGS

Other features and advantages of the present invention will become apparent to those skilled in the art to which the present invention relates from a reading of the following detailed description of preferred embodiments with reference to the accompanying drawings, in which.

DESCRIPTION OF PREFERRED EMBODIMENTS

Figure 1:
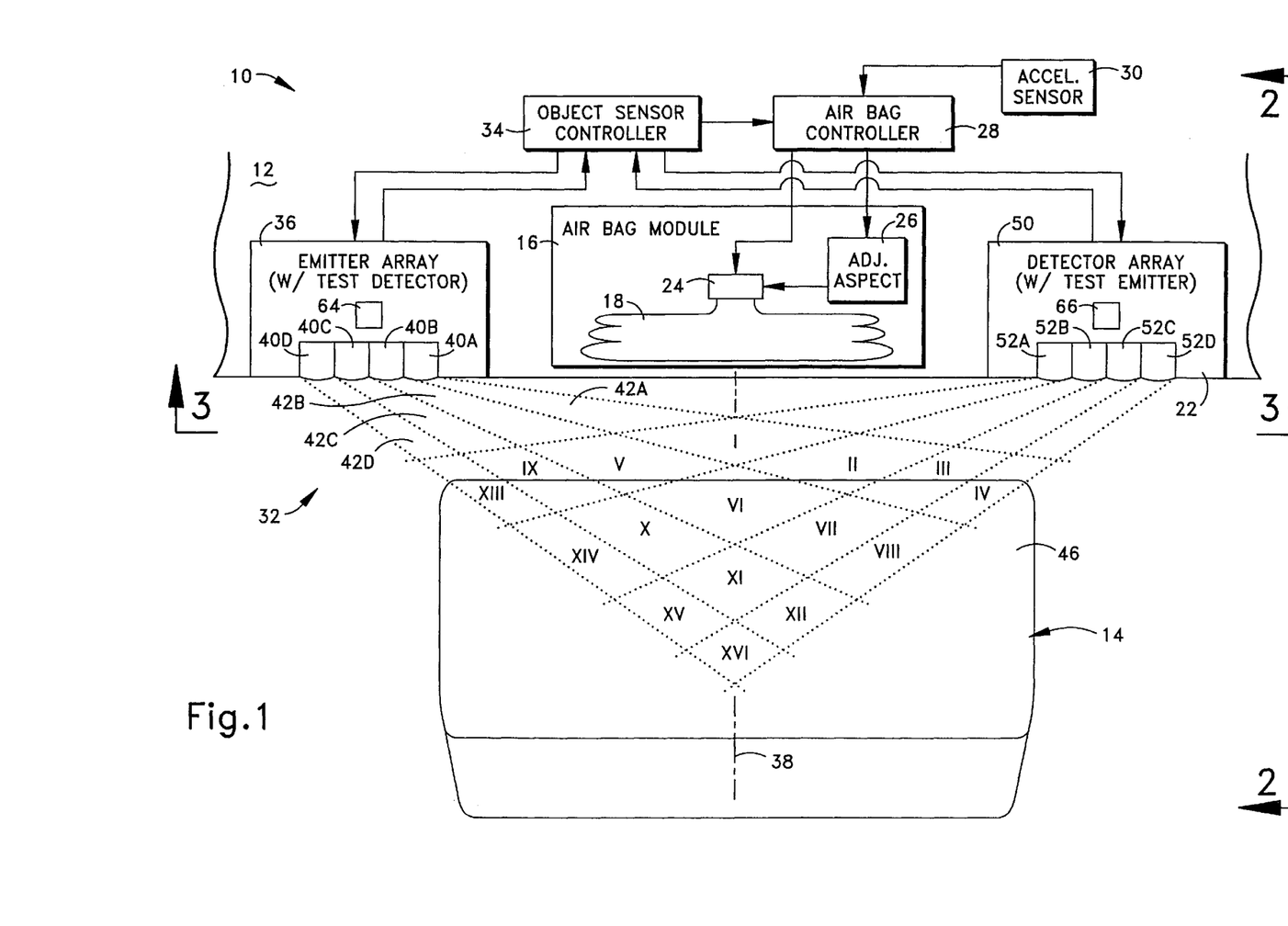
FIG. 1 is a schematic illustration of an occupant protection system that includes an apparatus in accordance with the present invention, within a vehicle.
Figure 2:
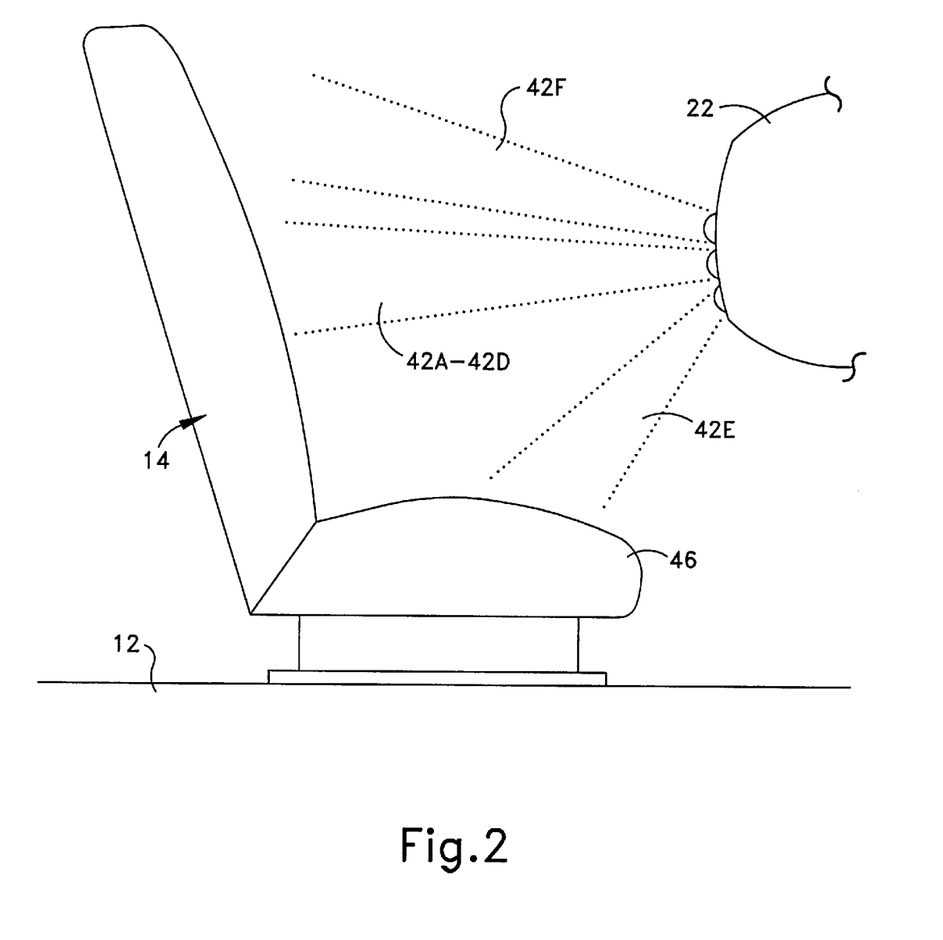
FIG. 2 is a view taken along line 2—2 in FIG. 1.

An occupant protection system 10 is schematically shown within a vehicle 12 in FIG. 1. The protection system 10 is associated with a front passenger seat 14 (FIG. 2) and is provided for a front seat passenger (not shown in FIG. 2). It is to be appreciated that the system 10 could be configured and located differently, and provided for another occupant, e.g., a rear seat passenger.

Within the protection system 10 (FIG. 1) is an actuatable occupant protection module 16 that includes an inflatable device 18. The inflatable device 18 is commonly referred to as an air bag, and thus the protection module 16 is commonly referred to as an air bag module. It is to be appreciated that the protection system 10 could include many other or different actuatable vehicle occupant protection devices, such as, for example actuatable seat belts, actuatable knee bolsters, actuatable head liners, and actuatable side curtains.

Prior to inflation deployment, the air bag 18 is folded and stored within an instrument panel 22, as is known in the art.

A source 24 of inflation fluid such an inert gas, is operatively connected to the air bag 18. Inflation fluid from the source 24, which may be generated by combustion of pyrotechnic material and/or released from a pressurized container, fills the air bag 18 to an inflated condition within an occupant compartment of the vehicle 12. Once inflated, as occurs during a vehicle collision, the air bag 18 hopefully protects the front seat passenger occupant.

The air bag module 16 is of the type referred to in the art as a "smart" module, in that the air bag module has at least one adjustable aspect 26. The adjustable aspect(s) 26 may be directed to deployment of the air bag 18. Examples of air bag deployment adjustment include adjustment of inflation timing, adjustment of inflation pressure, adjustment of location of the inflated air bag relative to an occupant, and suppression of deployment of the air bag.

A specific example of adjustment to inflation timing is control of the time of initiation of air bag inflation using a selected determination algorithm. A specific example of adjustment of inflation pressure is control of the inflation fluid source to provide a controlled or pre-selected amount of inflation fluid to the air bag, e.g., the air bag module has a plurality of separately controllable inflation fluid devices. Another specific example of adjustment of inflation pressure is control of a pressure relief valve, which vents inflation fluid away from the air bag.

A specific example of adjustment of air bag positioning is control of positioning motors operative to pivot the air bag module left or right within the instrument panel. Another specific example of adjustment of air bag positioning is moving the entire air bag module toward or away from the occupant. Dynamic profile control is accomplished by controllably directing inflation fluid into the air bag in predetermined zones within the air bag or by controlling the number and timing of operation of a plurality of inflation fluid devices and vent valves.

Control of the air bag module 16 to adjust the adjustable aspect(s) 26 and to cause actuation of the air bag module, is by an air bag controller 28. The controller 28 provides control signals to the air bag module. In one example, the air bag controller 28 includes a microcomputer. The air bag controller 28 receives sensory input from several sources and, using the sensory input, makes determinations regarding air bag control.

One of the sensory input sources for the air bag controller is a sensor 30 that senses a vehicle condition for which an occupant is to be protected. The sensor 30 provides a signal to the air bag controller 28 indicative of the sensed vehicle condition. In one example, which is illustrated in the Figures, the sensor 30 is a crash sensor and senses a condition that is indicative of a vehicle crash. Preferably, the crash sensor 30 is an accelerometer, and the signal is an electrical signal having a characteristic (e.g., voltage, frequency, etc.) indicative of the sensed crash acceleration. In another example, the sensor senses a condition indicative of a vehicle rollover.

It is to be appreciated that the protection system 10 could have a plurality of sensors providing signals to the air bag controller 28 that are indicative of a variety of vehicle conditions for which the occupant is to be protected. Hereinafter, for the purpose of brevity, only the single crash sensor 30 and its crash indicative signal are discussed.

The air bag controller 28 analyzes the signal from the crash sensor 30 and determines if a deployment crash condition is occurring. A deployment crash condition is one in which deployment of the air bag 18 is desired to enhance protection of the occupant. It is contemplated that any of several known crash algorithms can be used for the determination of a deployment crash condition. Examples of such algorithms are known in the art and are not discussed herein for brevity.

Sensory input to the air bag controller 28 is also provided via a sensory apparatus 32 in accordance with one aspect of the present invention. Specifically, the sensory apparatus 32 senses the presence of an object, such as a vehicle occupant, located upon the vehicle seat 14. Presence/absence of the object is one characteristic of the object. Further, the sensory apparatus 32 can determine the location of the object on the seat 14 relative to the instrument panel 22, as another object characteristic. The determination regarding location of the object is made via determination of the distance between the instrument panel 22 and a forward surface of the object. In addition, other characteristics regarding the object can be determined. Specifically, it can be discerned whether the object is a person, a parcel, or a child seat located upon the vehicle seat 14. These determinations are made within an object sensor controller 34 of the sensory apparatus 32.

The sensory apparatus 32 includes an emitter array 36 located at a first side of a passenger portion of the instrument panel (i.e., the portion of the instrument panel that is located in front of the passenger seat 14). In the illustrated embodiment, the first side of the passenger portion of the instrument panel 22 is the left side. Preferably, the distance to the emitter array 36 from a centerline 38 that bisects the associated seat 14 is approximately twelve (12) inches.

Figure 3:
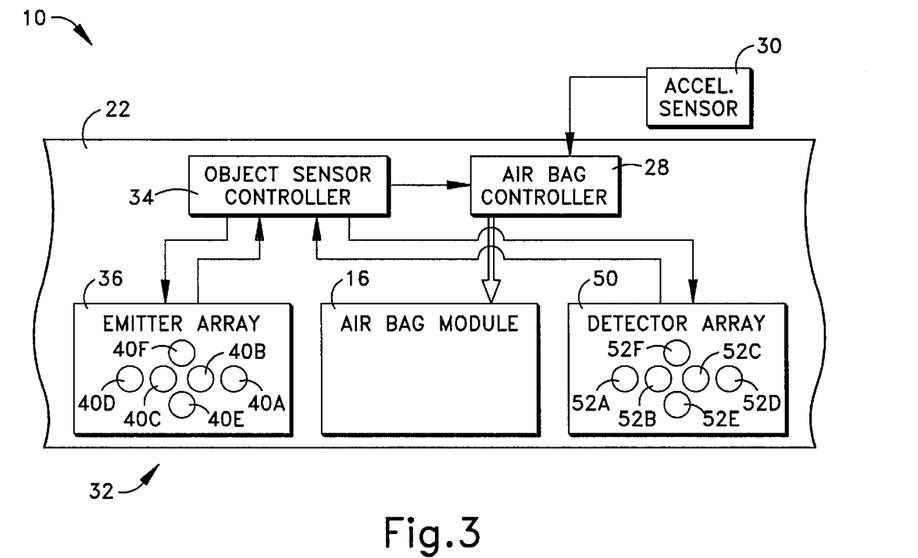
FIG. 3 is a view taken along line 3—3 in FIG. 1.

Within the emitter array 36 are a plurality of beam emitting devices 40 (hereinafter referred to as "emitters"). In the illustrated embodiment, there are six emitters 40A–40F (FIG. 3, the fifth and sixth emitters 40E and 40F are not shown in FIG. 1 so as not to obscure other structure). Each emitter (e.g., 40A emits a beam (e.g., 42A) toward the seat 14 (FIGS. 1 and 2), via control from the object sensor controller 34. Operational feedback is provided from the emitter array 36 to the object sensor controller 34.

Hereinafter, the emitters are referred to generically as emitter 40 for discussions that are generic to the emitters, and are referred to collectively as emitters 40 for discussions that are applicable to the several emitters. The alphabetic suffix (e.g., "A") is used for discussions that are specific to a particular emitter. Similar rules of discussion apply for the beams 42.

Preferably, each emitter 40 comprises s high-speed LED that is driven by an amplified oscillator source. In one embodiment, a 10.7 MHz frequency and a 6.144 MHz frequency are mixed to provide a drive frequency of 4.556 MHz. The drive frequency is filtered and amplified to improve performance.

Each emitter 40 has structure, such as a shroud or guide tube, to point its beam 42 in a desired direction and "baffle" all other directions. Each beam 42 diverges as it extends away from its respective emitter 40. The divergence may be accomplished by configuring each emitter 40 as a point source (i.e., an LED) with a convex or cylindrical lens. Preferably, the emitted beams 42 are infrared ("IR") light energy. It is to be appreciated that other types of energy beams such as ultrasonic or other electromagnetic beams could be employed without deviating from the scope of the present invention.

The first four emitters 40A–40D (FIG. 1) are arranged in an array extending in a horizontal plane (parallel to the plane of FIG. 1). The emitted beams 42A–42D from the first four emitters 40A–40D are aimed along the horizontal plane toward the centerline 38 of the seat 14, to extend over the seat bottom 46 at a predetermined height. Each of the first four beams (e.g., 42A) is aimed along a different direction from the emitter array 36. In other words, each beam "covers" a different portion of space. In the illustrated embodiment, the first-fourth beams 42A–42D do not overlap as they extend out from the emitter array 36. The non-overlap is merely for ease of illustration of the present invention. It is to be appreciated that the beams may overlap.

The first beam 42A extends to encompass areas I–IV. The second beam 42B extends to encompass areas V–VIII. The third beam 42C extends to encompass areas IX–XII, and the fourth beam 42D extends to encompass areas XIII–XVI. Each area is centered at a predetermined distance from the instrument panel 22. For example, the area I is centered approximately six (6) inches from the instrument panel 22, the area VI is centered approximately twelve (12) inches from the instrument panel, the area XI is centered approximately eighteen (18) inches from the instrument panel, and the area XVI is centered approximately twenty-four (24) inches from the instrument panel.

The fifth beam 42E (FIG. 2) is directed toward the centerline 38 of the seat 14, and crosses the centerline approximately eight to ten inches from the instrument panel 22. The fifth beam 42E does not extend along the plane with the first four beams 42A–42D. Instead, the fifth beam 42E is directed downward, toward the seat bottom 46. Thus, the fifth beam extends below the first four beams 42A–42D. As the fifth beam 42E crosses the centerline 38, the fifth beam is a few inches above the seat bottom 46.

The sixth beam 42F is directed toward the centerline 38 of the seat 14, and crosses the centerline approximately sixteen (16) inches from the instrument panel 22. The sixth beam 42F is directed at an angle upward. Accordingly, the sixth beam 42F extends above the first four beams 42A–42D.

A detector array 50 (FIG. 1) of the sensory apparatus 32 is located at the second side of the passenger portion of the instrument panel 22. Specifically, the second side is the right side (as viewed in FIG. 1) of the instrument panel 22. The detector array 50 is located at a distance approximately twelve (12) inches from the centerline 38 that bisects the seat 14. Accordingly, the detector array 50 is approximately twenty-four (24) inches away from the emitter array 36.

The detector array 50 (FIG. 3) includes six detector elements 52A–52F (hereinafter "detectors"). The detectors 52 detect IR energy of the emitted beams. Preferably, each detector 52 includes a high-speed IR photo-diode. It is to be appreciated that if a different type of beam (e.g., ultrasonic) is utilized, a suitable detector (e.g., ultrasonic) is utilized.

Each detector 52 includes structure for targeting a region in which the detector can detect IR energy of the beams 42 emitted from the emitter array 36. For example, suitable lens or baffles may be employed. The first four detectors 52A–52D target areas along the plane. The first detector 52A is targeted to detect IR energy in the areas I, V, IX, and XIII. The second detector 52B is targeted to detect IR energy in the areas II, VI, X, and XIV. The third detector 52C is targeted to detect IR energy in the areas III, VII, XI, and XV. The fourth detector 52D is targeted to detect IR energy in the areas IV, VIII, XII, and XVI.

The areas that are located on the centerline 38 of the seat 14 are termed the primary areas. The area II is the primary area for the first emitter/detector pair, because the first detector 52A can detect the first beam 42A in the area I. The area VI is the primary area for the second emitter/detector pair, because the second detector 52B can detect the second beam 42B in the area VI. Similarly, for the third emitter/detector pair, the area XI is the primary area, and for the fourth emitter/detector pair, the area XVI is the primary area.

The fifth detector 52E (FIG. 3) is targeted to the area where the fifth beam 42E (FIG. 2) crosses the centerline 38 of the seat 14. Specifically, the fifth detector 52E is targeted at an area at the centerline 38, below the first four beams 42A–42D. Similarly, the sixth detector 52F (FIG. 3) is targeted to the area where the sixth beam 42F (FIG. 2) crosses the centerline 38 of the seat 14. Specifically, the sixth detector 52F is targeted at an area at the centerline 38, above the first four beams 42A–42D.

It is to be appreciated that the dotted lines used in the Figures for the aiming and targeting directions/areas are for illustrative purposes only. Actual directions, locations, and areas may differ due to a distribution (e.g., Gaussian distribution) of the beams, physical properties of the aiming/targeting structure (e.g., the lenses), and the like. Thus, the illustrations herein are not intended to limit the present invention.

The detection of IR energy from one of the emitters 40 by one of the detectors 52 is via reflection of the beam 42 from a surface of an objection located on the seat 14. Such an object may be a vehicle occupant, a parcel, or a rearward-facing seat for an infant occupant (commonly referred to as an "RFIS").

The IR energy intensity detected by one of the first-fourth detectors 52A–52D is dependent upon the angle of reflection of the detected beam 42. Specifically, the greatest relative intensities typically are associated with the primary areas (i.e., I, VI, XI, and XVI).

The detector array 50 provides signals to the object sensor controller 34 that are indicative of reception characteristics (e.g., receipt of a reflected beam, the intensity of the received beam, and the phase of the received beam). The object sensor controller 34 processes the signals provided by the detector array 50 and determines at least one characteristic of the object. In particular, the object sensor controller 34 makes a determination as whether an object is present on the seat 14 and determines the distance between the instrument panel 22 and the object located on the seat 14. If the object is an occupant, the distance determinations are useful for determining whether the occupant is "out-of-position." The determinations may also include determination(s) regarding movement of the object relative to the instrument panel 22 and a determination(s) regarding the type of object (e.g., a characterization of the object as an adult occupant, a package, or a RFIS).

The object sensor controller 34 provides a signal to the air bag controller 28 that is indicative of the determinations made within the object sensor controller. The air bag controller 28 uses the information contained within the signal to control deployment of the air bag module 16 and/or control a deployment profile of the air bag module. Preferably, the information is processed via an algorithm.

Figure 4:
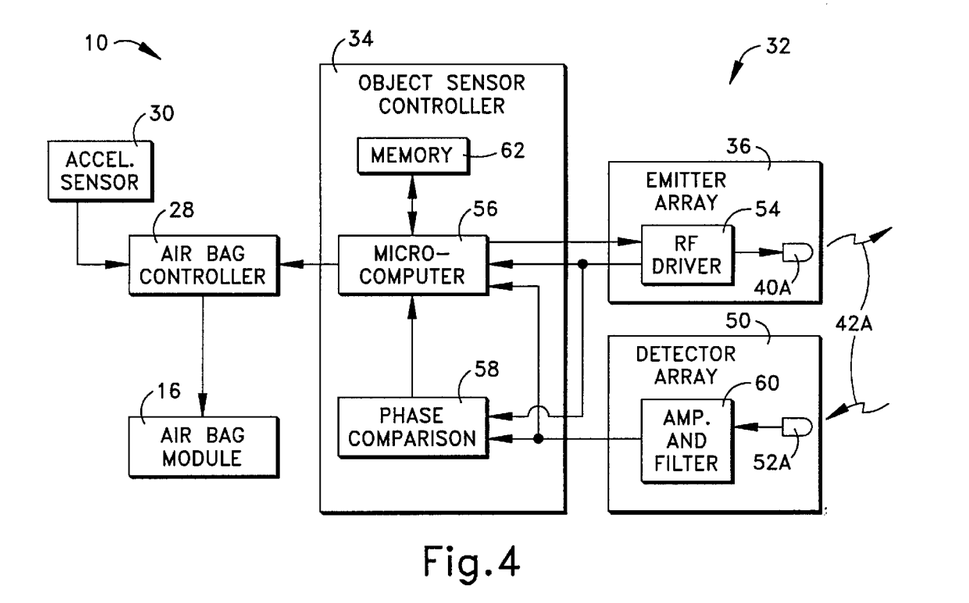
FIG. 4 is a function block diagram of the system shown in FIG. 1.

FIG. 4 is a function block illustration of the sensory apparatus 32 for emission of one beam (e.g., 42A) from one of the emitters (e.g., 40A) and reception of reflected IR energy by one of the detectors (e.g., 52A). It is to be appreciated that the sensory apparatus 32 has structure to accomplish the illustrated functional blocks for each of the emitters 40 and for each of the detectors 52. Alternatively, multiple emitters 40 and detectors 52 can be multiplexed on the structure represented by one set of function blocks.

The emitter 40A is operatively connected to a RF driver 54. The RF driver 54 provides an energizing signal to the emitter 40A at a RF frequency. The RF driver 54 is operatively connected to a microcomputer 56 and a phase comparison function 58 of the object sensor controller 34. The microcomputer 56 controls the operation of the RF driver 54. When the RF driver 54 energizes the emitter 40A, the RF driver provides a signal indicative of the excitation and the phase of the frequency of excitation to both the microcomputer 56 and the phase comparison function 58.

At the detector array 50, the detector 52A is operatively connected to an amplifier and filter arrangement 60 that outputs an amplified and filtered signal indicative of reception characteristics (e.g., reception of IR energy, intensity of the received energy, and phase of the received energy). The output of the amplifier and filter arrangement is provided to both the microcomputer 56 and the phase comparison function 58.

Within the phase comparison function 58, the phase difference between the emitted signal and the reflected/received signal is determined. In one example, the received signal frequency at 4.556 MHz is mixed with the original 6.144 MHz signal to produce a 10.7 MHz frequency that is provided to a quadrature detector. An adjustable tuned circuit phase-shifts the 10.7 MHz signal to position the phase on the linear part of the output curve of the quadrature detector. The quadrature detector provides an output voltage that is related to the phase difference between the emitted signal and the reflected/received signal. As one possible option, a varactor is used to "tune" the reception.

The determination regarding the phase difference is provided to the microcomputer 56. The phase difference is indicative of a time-of-flight of the received beam. Specifically, the time-of-flight is the time required for the beam that is emitted from the emitter array 36 to travel to the object, be reflected from the object, and travel to the detector array 50.

The microcomputer 56 compiles all of the received information. In particular, the microcomputer 56 is operatively connected to a memory 62 for information storage before, during, and after processing by the microcomputer. Within the microcomputer 56, all of the information regarding reception of IR energy, intensity of the received IR energy, and phase difference (i.e., time-of-flight) information is processed. In one example, a full reading cycle occurs within ten (10) milliseconds, with a reading interval of 500 milliseconds for seventeen (17) readings.

In a rudimentary form, the microcomputer 56 can look solely to the information regarding areas I, VI, XI, and VI (i.e., the primary areas) to make a distance determination between the instrument panel 22 and an object located on the seat 14. Specifically, the microcomputer 56 determines which area of the four primary areas I, VI, XI, and XVI is associated with a reflection of a beam toward the detector array 50.

For example, with reference to FIG. 1, if an object is located far enough from the instrument panel, only the area XVI will have a reflection. Area I does not have a reflection of the first beam 42A to the first detector 52A because the object is not located in area I. Similarly, area VI is not associated with a reflection of the second beam 42B to the second detector 52B, and the area XI is not associated with a reflection of the third beam 42C to the third detector 52C. Thus, based upon intensity comparison, it is clear that reflection associated with area XVI will have a greatest intensity for the primary areas.

The determination regarding distance based upon a received reflection from the primary areas is confirmed via a time-of-flight calculation for the reflection that occurs in area XVI. The difference between the phase of the emitted fourth beam and the reflected/received fourth beam is indicative of the time of flight. The time of flight is indicative of the distance of travel of the beam. In turn, the distance of travel is indicative of the distance between the object that reflected the beam and the instrument panel 22. Thus, because the area XVI is the furthest area from the instrument, the time of flight is relatively large, and the calculated distance is relatively large.

Figure 5:
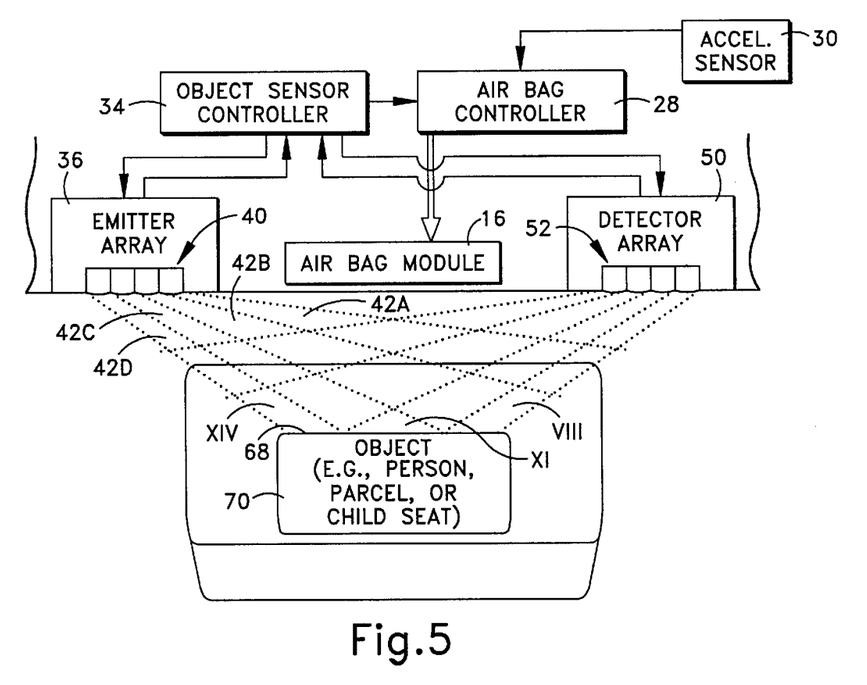
FIG. 5 is a view similar to FIG. 1 and shows sensing of an object at a first position.
Figure 6:
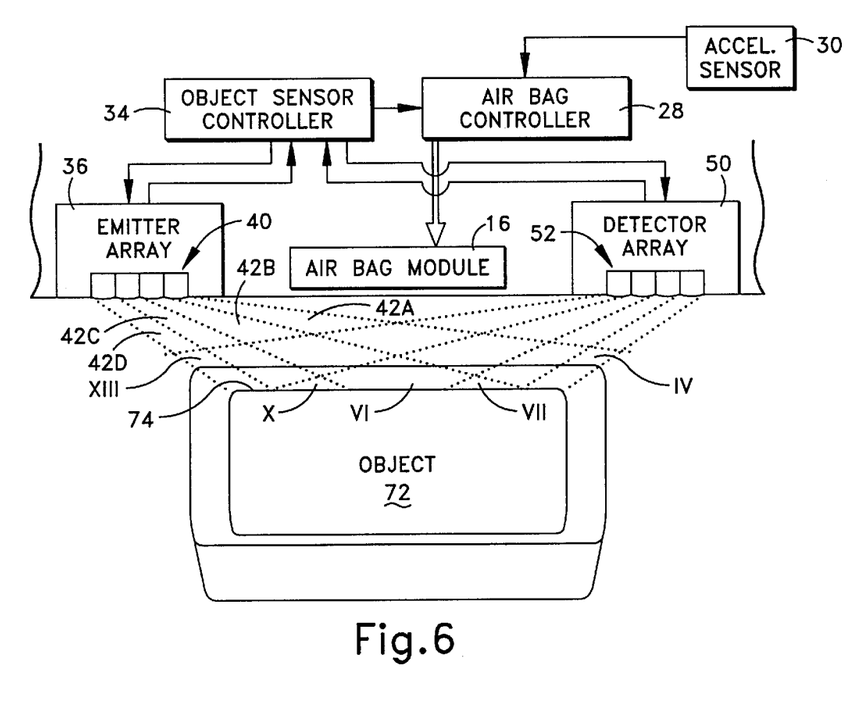
FIG. 6 is a view similar to FIG. 5, but shows sensing of an object at a second position.

Examples of beam reflections off of the object for characteristic determination(s) (i.e., presence, distance, etc.) are shown in FIGS. 5 and 6. In FIG. 5, a forward facing surface 68 of an object 70 is located such that the surface extends through areas XIV, XI, and VIII. The surface 68 does not extend through any area that is associated with the first beam 42A. Accordingly, the first beam 42A is not reflected, and none of the IR energy of the first beam is detected at any of the detectors 52.

The area VIII is associated with the second beam 42B, and the fourth detector 52D detects the reflected beam. The area XI is associated with the third beam 42C, and the third detector 52C detects the reflected beam. The area XIV is associated with the fourth beam 42D, and the second detector 52B detects the reflected beam.

The area XI is the primary area for the third emitter/detector pair; thus the intensity of detected IR energy is relatively high. The area VIII is not the primary area; thus the detected IR energy is less intense. Similarly, the area XIV is not a primary area and the detected IR energy is less intense.

Another example of an object 72 that is sensed by the apparatus 32 is shown in FIG. 6. The forward facing surface 74 of the object 72 is closer to the instrument panel 22 than the surface 68 of the object 70 in FIG. 5. Accordingly, reflection of respective beams occurs at areas XIII, X, VI, VII, and IV.

Going beyond mere distance determination and/or calculation, all of the information provided to the microcomputer 56 (FIG., 4) and calculated by the microcomputer can be utilized to provide a more comprehensive profile of sensed object characteristics. Specifically, various reception, intensity, and time-of-flight information can be used in a redundant manner to verify the distance between the instrument panel 22 and an object. Moreover, information provided from the fifth and sixth emitter/detector pairs can be utilized to determine the overall height and/or additional position information of the object. Also, the information from fifth and sixth emitter/detector pairs can be utilized to determine whether the object is a RFIS. Further, the changes of the sensed distances over time can be used to determine movement of the object (i.e., an animated object that is indicative of the object being an occupant).

The sensory apparatus 32 has structure for testing and calibrating the emitters 40 and the detectors 52. In the illustrated embodiment, a test detector 64 is located in the emitter array 36. The test detector 64 is located and configured to detect each of the emitted beams. Thus, the test detector 64 is used to determine whether all of the emitters are properly operating. The object sensor controller controls testing, and the test information is provided to the object sensor controller. In one example, structure is provided such that a small amount of the beam (e.g., IR energy) of each emitter 40 is directed or "spilled" into the test detector 64 to accomplish the function of the test detector.

Similarly, a test emitter 66 is located in the detector array 50. The test emitter 66 is located and configured to emit test IR energy that is detected by each of the detectors. Thus, the test emitter 66 is used to determine whether all of the detectors are properly operating. In one example, structure is provided to direct a beam of the test emitter 66 into each detector 52. The object sensor controller controls testing, and the test information is provided to the object sensor controller. Typically, the testing is performed upon power-up of the system.

Any suitable calibration components and/or functions can be used in the apparatus 32. For example, an additional emitter/detector pair can be aimed directly at each other within the instrument panel. The direct flight path measurements are used as calibration standards.

Turning now again to the emission/detection of the beams 42A–42F, it is to be appreciated that because there are a plurality of beams, the sensory apparatus 32 is configured to prevent beam confusion. In other words, when a detector 52 receives a reflected beam, the emitter 40 that provided the beam 42 is discernable. A first way to configure the sensory apparatus 32 to avoid beam confusion is synchronize the emitters 40 such that only one beam 42 is emitted at a time. Thus, reception of a reflection at any detector 52 is definitively associated with the single emitted beam.

Figure 7:
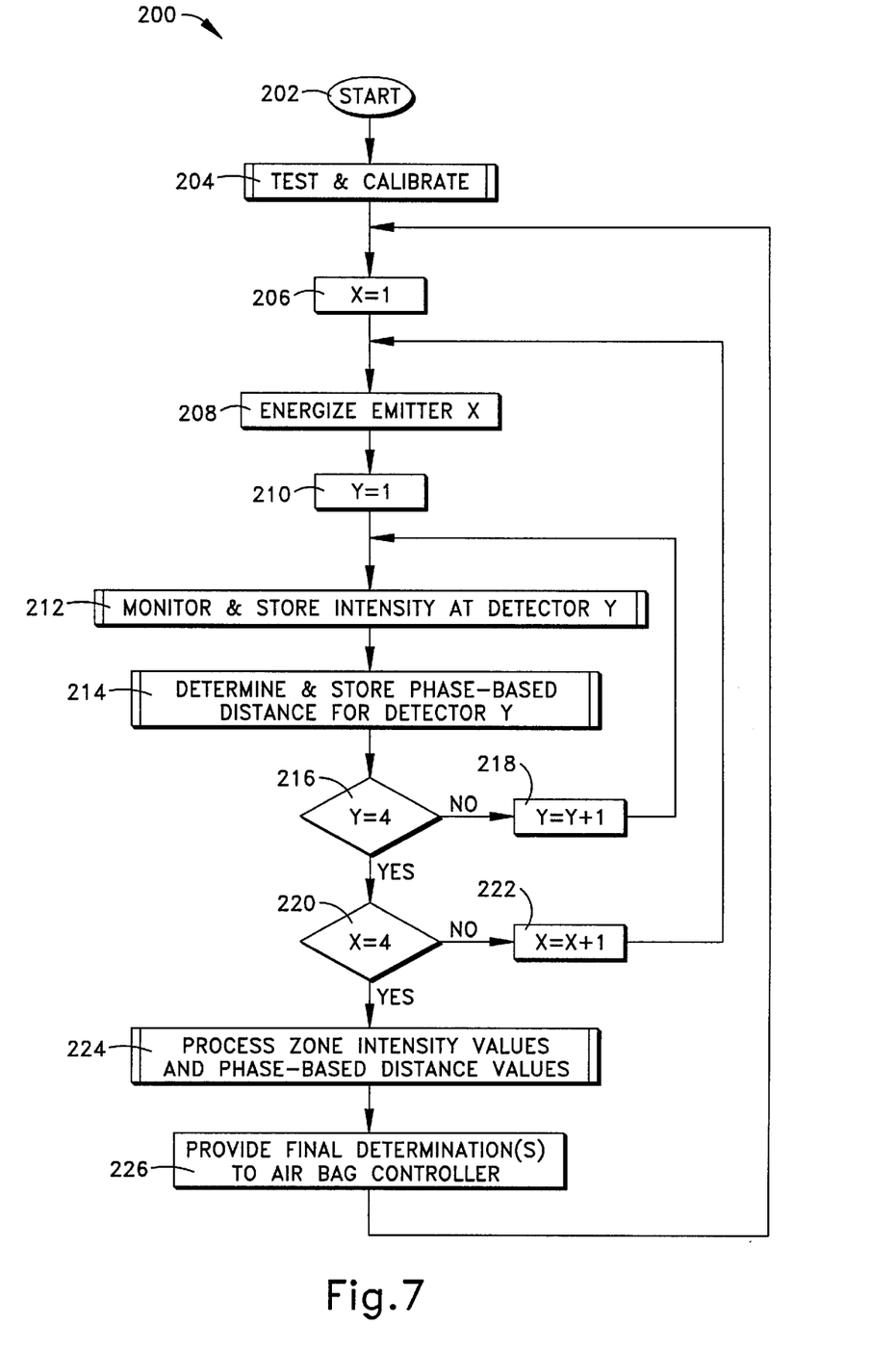
FIG. 7 is a flow chart for a process performed in accordance with the present invention within the apparatus shown in FIG. 1.

FIG. 7 is an example of a process 200 for beam emission/detection via synchronization of the emitters 40 to emit a single beam at a time. The process 200 begins at step 202 and proceeds to step 204. At step 204, the apparatus performs self-tests and calibration procedures.

At step 206, a variable X is set to an initial value of 1. At step 208, the emitter X is energized (e.g., at 4.5 MHz). For the first time through the process, the value of X is 1, and thus the first emitter 40A is energized. At step 210, a variable Y is set to an initial value of 1. At step 212, a signal that is received at the detector Y is monitored and the intensity of such a received signal is stored. For the first time through the process 200, the variable Y is set to 1, such that the detector that is monitored is the first detector 52A.

At step 214, a phase-based distance is determined for the received signal at detector Y. The determined distance is stored. At step 216, it is determined whether the variable Y is equal to 4. If the determination at step 216 is negative (i.e., the variable Y is less than 4 indicating that all of the detectors have not been monitored), the process 200 proceeds to step 218.

At step 218, the variable Y is incremented by 1. The process loops back to step 212 in which the intensity at detector Y is monitored and stored. Because the variable Y was incremented, the second detector 52B is monitored and the value of the intensity stored.

The process 200 continues to repeat steps 212, 214, 216 and 218 to sequentially monitor and store, and determined phase-base distance for each of the first four detectors. When the determination at step 216 is affirmative (i.e., Y is equal to 4, and all of the detectors have been sequentially monitored), the process 200 proceeds to step 220. At step 220, it is determined whether the variable X is equal to 4 (i.e., it is determined whether all of the emitters have been selectively energized). If the determination at step 220 is negative (i.e., X is less than 4 indicating that all of the emitters have not yet been sequentially energized for a particular sequence), the process 200 proceeds to step 222. At step 222, the variable X is incremented by 1. The process 200 loops back to step 208. At step 208, the emitter X is energized. Because the variable X had been incremented from 1 to the value 2, the second emitter 40B is energized.

The process 200 proceeds from step 208 to step 210 in which the variable Y is set to the value 1. At step 212, the first detector 52A is monitored and the intensity thereat is stored. At step 212, the phase-base distance is determined for the first detector 52A. The process 200 continues with steps 216, 218 and repeats the sequence of steps 212–218 such that all of the detectors are monitored for reception of the reflected second beam 42B.

Again, at step 216, when Y equals 4, the process 200 goes to step 220. At step 220, it is again queried whether the variable X is equal to 4. Thus, it should be apparent that the process 200 continues through the nested loop group of steps 208–222 until all of the emitters 40 have been sequentially energized and, for each energized emitter, all of the detectors 52 are monitored. When the determination at the step 220 is affirmative (i.e., the variable X is equal to 4 and all of the emitters have been sequentially energized for a single sequence), the process 200 proceeds to step 224.

At step 224, the information provided with regard to the area-associated intensities and the phase-base distances are processed to make one or more determinations regarding presence, position, etc. of an object. At step 226, the final determinations are provided to the air bag controller 28. Upon completion of step 226, the process 200 loops back to step 206 in which the variable X is again set to 1. From step 206, the process 200 again proceeds to sequence through the four emitters, monitoring each detector for each of the emitted means.

Figure 8:
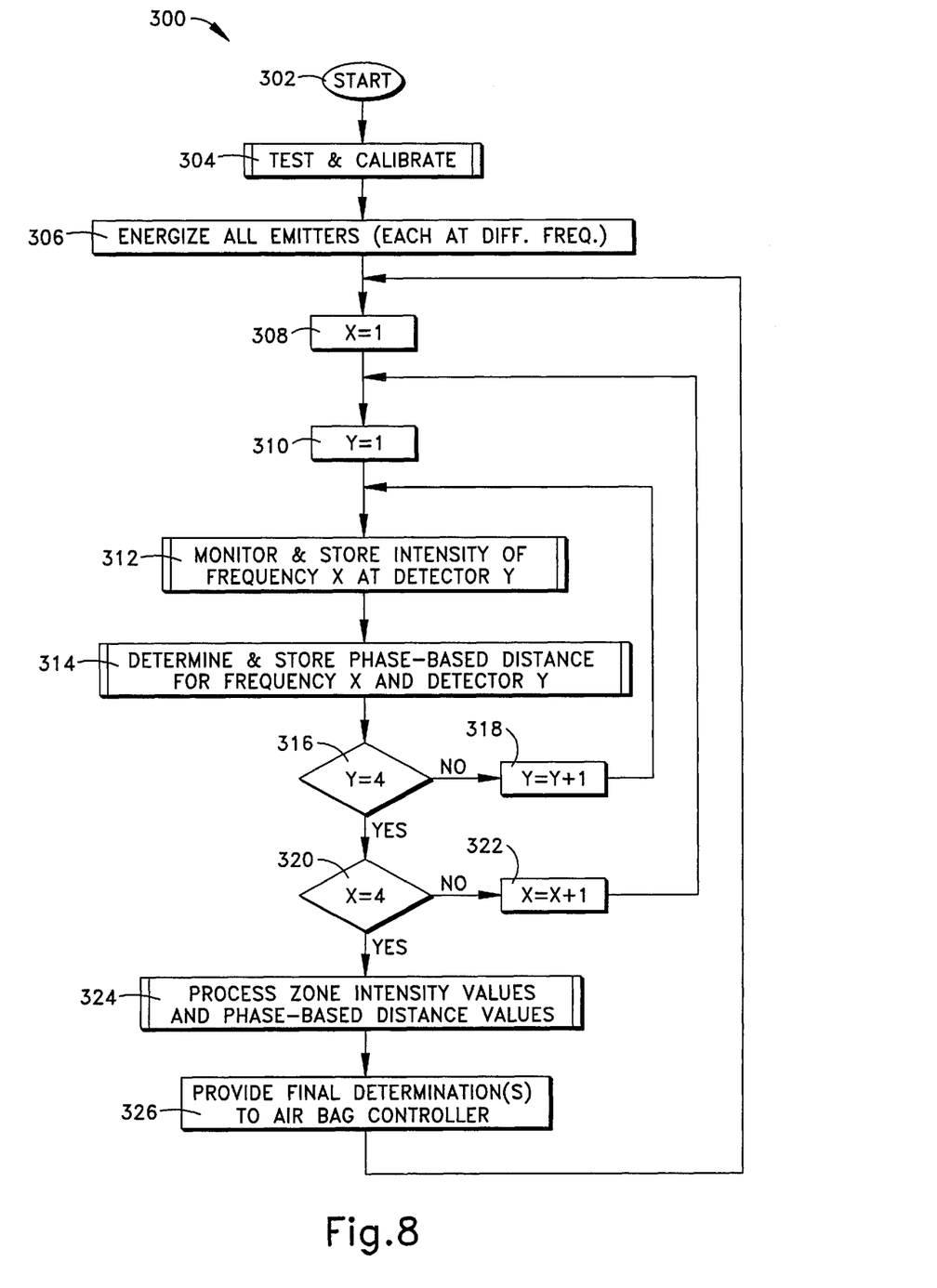
FIG. 8 is another embodiment of a process performed in accordance with the present invention within a controller shown in FIG. 1.

A second way to configure the sensory apparatus 32 to avoid signal confusion is to utilize emitters 40 having different frequencies. An example of a process 300 for the sensory apparatus 32 utilizing different frequency emitted beams is shown in FIG. 8. The process 300 begins at step 302 and proceeds to step 304 in which the apparatus is tested and calibrated.

At step 306, all of the emitters 40 are energized at different frequencies. At step 308, a variable X is set to a value of 1. At step 310, the variable Y is set to a value of 1. At step 312, the detector Y is monitored for a received beam at a frequency X (it is to note that the values of X merely represent different frequencies and are not frequency values themselves). The intensity of such a received beam is stored. Thus, for a first time through the process 300, the first detector 52A is monitored for reception of the first frequency. At step 314, a phase-based distance is determined for the frequency X at the detector Y. The determined distance is stored.

At step 316, it is determined whether the variable Y is equal to 4 (i.e., whether all of the detectors have been monitored for the frequency X). If the determination at step 316 is negative (i.e., all of the detectors have not yet been monitored for the frequency X), the process 300 goes to step 318. At step 318, the variable Y is incremented by 1. The process loops back to step 312. The detector Y is monitored for the frequency X. At this point, because the variable Y was incremented, the second detector 52B is monitored. The process 300 continues to repeat these steps 312–318 until all of the detectors have been monitored, the phase-base distances determined, and the information stored.

When the determination at step 316 is affirmative (i.e., Y equals 4 indicating that all of the detectors have been monitored for the frequency X), the process 300 goes to step 320. At step 320, it is determined whether X equals 4 (i.e., whether all of the frequencies have been monitored). If the determination at step 320 is negative (i.e., X is less than 4 indicating that all of the frequencies have not yet been monitored), the process 300 goes to step 322. At step 322, the variable X is incremented by 1. Upon completion of step 322, the process 300 loops to step 310. The steps 310–322 are repeated until all of the frequencies have been monitored at all of the detectors.

When the determination at step 320 is affirmative (i.e., X equals 4 indicating that all of the frequencies have been monitored at all of the detectors 52), the process 300 goes to step 324. At step 324, the area-associated intensity values and the phase-based distance values are processed to provide for the various determinations (i.e., presence, distance, and type of the object). At step 326, the final determinations are provided to the air bag controller 28. Upon completion of step 326, the process 300 loops to step 308 in which the variable X is again set to 1. At step 310, the variable Y is set to 1. The process continues with step 312, etc. to again monitor for each of the frequencies at each of the detectors.

From the above description of the invention, those skilled in the art will perceive improvements, changes and modifications. For example, the emitter and detector arrays may have different number of elements and/or may be arranges in a different configuration (e.g., vertical). Also, different aiming schemes may be employed, such as primary areas located along a 2–8 inch span from the instrument panel.

Further, other features may be added. Such features include locating the emitter and detector arrays behind IR transparent plastic filters. The filters would reduce unwanted light transmission and would effectively hide the arrays. Another feature is a warning (e.g., audible/visual) given when an array is blocked (e.g., such as by a hand). Also, a "heart beat" to the air bag controller from the object sensor controller would indicate that the apparatus is operational at any given time.

Even further, the emitters and detectors may be located at portions of the vehicle other than the instrument panel. For example, the emitters and/or detectors may be located in a head liner, door panel, or other vehicle interior component. Also, the emitters and detectors need not be grouped into arrays, but may be distributed about the vehicle interior. Such improvements, changes and modifications within the skill of the art are intended to be covered by the appended claims.

Having described the invention, the following is claimed:

1. An apparatus for determining an object characteristic of an object that may be located on a seat of a vehicle, said apparatus comprising:

an array of emitting means on a portion of the vehicle, each emitting means for emitting a beam along a path on which the object may be located, each path being in a different direction;

an array of receiving means on the portion of the vehicle, each receiving means for receiving beams emitted from said array of emitting means that are reflected from the object, each reflected beam received at said array of receiving means being indicative of distance between the portion of the vehicle and the object;

means for determining relative intensities at each receiving means of each reflected and received beam;

means for determining time-of-flight of each reflected and received beam between emission of the beam from said array of emitting means and reception of the beam at said array of receiving means; and means for processing each determined relative intensity and each determined time-of-flight to determine an object characteristic, and for providing a signal indicative thereof.

2. An apparatus as set forth in claim 1, wherein the object characteristic is the current distance that the object is located away from the portion of the vehicle, said means for processing includes means for determining the distance between the object and the portion of the vehicle.

3. An apparatus as set forth in claim 1, wherein the object characteristic is the presence/absence of the object on the vehicle seat, said means for processing includes means for determining whether the object is present on the vehicle seat.

4. An apparatus as set forth in claim 1, wherein the object characteristic is the type of object on the vehicle seat, said means for processing includes means for determining the type of the object.

5. An apparatus as set forth in claim 4, wherein said means for processing includes means for determining whether the object is a person or a package.

6. An apparatus as set forth in claim 1, wherein said array of emitting means includes an array of light emitting means, and said array of receiving means includes an array of light receiving means.

7. An apparatus as set forth in claim 1, wherein said means for determining the time-of-flight includes means for determining a phase difference between respective emitted and received beams.

8. An apparatus as set forth in claim 1, wherein the vehicle seat has a seat bottom, each of said emitting means of said array of emitting means includes means for directing its emitted beam along a height above the seat bottom and each of said array of receiving means includes means for targeting reception of the associated beam at the height above the seat bottom.

9. An apparatus as set forth in claim 8, including another emitting means for emitting another beam along a path on which the object may be located and another receiving means for receiving the another beam emitted from said another emitting means and reflected from the object, said another emitting means includes means for directing its emitted beam at a height different than the height of aim of the beams emitted from said array of emitting means, and said another receiving means includes means for targeting reception of the another beam at the height of aim of the another beam.

10. An apparatus as set forth in claim 1, wherein said apparatus is part of an occupant protection system, and including means for providing the signal indicative of the determined characteristic to a device for controlling an actuatable occupant protection device.

11. An apparatus for distance determination between a portion of a vehicle that is located adjacent to a vehicle seat and a surface of an object located on the vehicle seat, said apparatus comprising:
   an array of emitting means, each for emitting a beam toward an associated area at which the surface of the object may be located, each area being located at a different distance from the portion of the vehicle;
   an array of receiving means, each for receiving the beam originating from an associated one said emitting means that is reflected from the surface of the object located at the associated area;
   means for determining whether reception occurs of each beam at its associated receiving means;
   means for determining a time-of-flight of each received beam between emission and reception; and
   means for processing results of the determinations of reception and time-of-flight to determine the distance between the portion of the vehicle and the surface of the object, and for providing a signal indicative thereof.

12. An apparatus as set forth in claim 11, wherein said array of emitting means includes an array of light emitting means, and said array of receiving means includes an array of light receiving means.

13. An apparatus as set forth in claim 11, wherein said means for determining the time-of-flight includes means for determining a phase difference between respective emitted and received beams.

14. An apparatus as set forth in claim 11, wherein the vehicle seat has a seat bottom, each of said emitting means of said array of emitting means includes means for directing its emitted beam along a height above the seat bottom and each of said array of receiving means includes means for targeting reception of the associated beam at the height above the seat bottom.

15. An apparatus as set forth in claim 14, including another emitting means for emitting another beam along a path on which the object may be located and another receiving means for receiving the another beam emitted from said another emitting means and reflected from the object, said another emitting means includes means for aiming its emitted beam at a height different than the height of aim of the beams emitted from said array of emitting means, and said another receiving means includes means for targeting reception of the another beam at the height of aim of the another beam.

16. An apparatus as set forth in claim 11, wherein said apparatus is part of an occupant protection system, and including means for providing the signal indicative of the determined characteristic to an device for controlling a actuatable occupant protection device.

17. An apparatus for determining an object characteristic of an object that may be located on a seat of a vehicle, said apparatus comprising:
   a plurality of emitting means located on the vehicle, each emitting means for emitting a beam along a path on which the object may be located, each path being in a different direction;
   a plurality of receiving means located on the vehicle, each receiving means for receiving at least one emitted beam that has been reflected from the object, each reflected beam received at one of said receiving means being indicative of a distance to the object;
   means for determining relative intensities at each receiving means of each reflected and received beam;
   means for determining time-of-flight of each reflected and received beam between emission and reception; and
   means for processing each determined relative intensity and each determined time-of-flight to determine an object characteristic, and for providing a signal indicative thereof.

18. An apparatus as set forth in claim 17, wherein said plurality of emitting means is grouped in an array, and said plurality of receiving means is grouped in an array.

19. An apparatus as set forth in claim 18, wherein said array of emitting means is located on a portion of the vehicle, said array of receiving means is located on the portion of the vehicle.

20. An apparatus a set forth in claim 19, wherein said portion of the vehicle is an instrument panel, said array of emitting means is located on one part of the instrument panel and said array of receiving means is located on another part of the instrument panel.

21. A method for determining an object characteristic of an object that may be located on a seat of a vehicle, said method comprising:
   emitting a plurality of beams, each beam being directed along a path on which the object may be located, each path being in a different direction;

receiving emitted beams that are reflected from the object at reception locations, each reflected beam being indicative of distance between a portion of the vehicle and the object;

determining relative intensities at each reception location of each reflected and received beam;

determining time-of-flight of each reflected and received beam between the emission of the beam and the reception of the beam;

processing each determined relative intensity and each time-of-flight to determine a distance between the portion of the vehicle and the object; and providing a signal indicative of the determined object characteristic.

22. A method for distance determination between a portion of a vehicle that is located adjacent to a vehicle seat and a surface of an object located on the vehicle seat, said method comprising:

emitting a plurality of beams, each beam being directed toward an associated area at which the surface of the object may be located, each area being located at a different distance from the portion of the vehicle;

receiving an emitted beam that is reflected from the surface of the object located at the associated area;

determining which emitted beam was reflected from the surface of the object and received to indicate that the surface of the object is located at the associated area;

determining a time-of-flight of the reflected and received beam between the emission of the received beam and the reception of the received beam;

processing results of the determinations of reception and time-of-flight to determine the distance between the portion of the vehicle and the surface of the object; and providing a signal indicative of the determination of the distance.

23. An apparatus as set forth in claim 8, wherein said array of emitting means and said array of receiving means are positioned such that the emitted beam from each of said emitting means is receivable at each of said receiving means, with each pair of one of said emitting means, which emits its beam, and one of said emitting means, which receives the beam emitted from said one of said emitting means, corresponding to a distance from the portion of the vehicle.

24. An apparatus as set forth in claim 23, wherein each of said receiving means receives reflected beams that proceed along a path, each path being in a different direction, said array of emitting means and said array of receiving means are positioned such that the paths for said array of emitting means and the paths for said array of receiving means intersect to form a grid of areas, each area being at a specific distance from the portion of the vehicle.

25. An apparatus as set forth in claim 24, wherein the object characteristic is the current distance that the object is located away from the portion of the vehicle, said means for processing includes means for determining the pairing of which one of said receiving means receives a beam emitted from one of said emitting means to indicate the current distance that the object is located away from the portion of the vehicle.

26. An apparatus as set forth in claim 1, wherein said array of emitting means is spaced away from said array of emitting means.

* * * * *